United States Patent [19]

Kerr et al.

[11] Patent Number: 5,653,886
[45] Date of Patent: Aug. 5, 1997

[54] COAGULANT FOR MINERAL REFUSE SLURRIES

[75] Inventors: E. Michael Kerr, Aurora; John R. Hurlock, Hickory Hills; Lawrence J. Connelly, Oak Lawn, all of Ill.

[73] Assignee: Nalco Chemical Company, Naperville, Ill.

[21] Appl. No.: 497,675

[22] Filed: Jun. 30, 1995

Related U.S. Application Data

[63] Continuation-in-part of Ser. No. 178,169, Jan. 6, 1994, abandoned.

[51] Int. Cl.$^6$ .................................................. C02F 1/56
[52] U.S. Cl. .......................... 210/727; 209/5; 210/734; 210/735; 210/738
[58] Field of Search ................................ 209/5; 210/609, 210/705, 725, 727, 728, 732, 733, 734, 735, 738

[56] References Cited

U.S. PATENT DOCUMENTS

| | | | |
|---|---|---|---|
| Re. 28,807 | 5/1976 | Panzer et al. | 210/736 |
| Re. 28,808 | 5/1976 | Panzer et al. | 210/736 |
| Re. 32,649 | 4/1988 | Brandt et al. . | |
| 2,926,161 | 2/1960 | Butler et al. | 260/89.7 |
| 3,284,393 | 11/1966 | Vanderhoff et al. | 260/29.6 |
| 3,624,019 | 11/1971 | Anderson et al. | 260/29.6 H |
| 3,734,873 | 5/1973 | Anderson et al. | 260/29.6 H |
| 3,920,599 | 11/1975 | Horlock et al. | 260/34.2 |
| 3,968,037 | 7/1976 | Morgan et al. | 210/734 |
| 4,077,930 | 3/1978 | Lim et al. . | |
| 4,252,706 | 2/1981 | Phillips et al. | 260/29.6 H |
| 4,536,186 | 8/1985 | Rey . | |
| 4,614,593 | 9/1986 | Roark | 210/735 |
| 4,673,511 | 6/1987 | Richardson et al. . | |
| 4,715,962 | 12/1987 | Bhattacharyya et al. | 210/735 |
| 4,906,386 | 3/1990 | Vasconcellos et al. . | |
| 4,950,725 | 8/1990 | Flesher et al. . | |
| 5,110,883 | 5/1992 | Gartner | 526/307.3 |
| 5,171,783 | 12/1992 | Gartner | 526/307.3 |
| 5,178,774 | 1/1993 | Payne et al. | 210/727 |
| 5,183,575 | 2/1993 | Vasconcellos et al. . | |
| 5,198,528 | 3/1993 | Smith et al. . | |
| 5,200,482 | 4/1993 | Gartner | 526/307.3 |
| 5,210,298 | 5/1993 | Shimomura et al. | 526/240 |
| 5,314,420 | 5/1994 | Smith et al. | 210/691 |
| 5,476,522 | 12/1995 | Kerr et al. | 210/735 |
| 5,518,634 | 5/1996 | Pillai et al. | 210/727 |

FOREIGN PATENT DOCUMENTS

| | | | |
|---|---|---|---|
| 0103698 | 3/1984 | European Pat. Off. | 526/295 |
| 161 763 A | 3/1985 | European Pat. Off. . | |
| 0161733 | 11/1985 | European Pat. Off. | 526/295 |
| 0495312 | 7/1992 | European Pat. Off. | 526/295 |
| 6126114 | 6/1986 | Japan | 526/295 |
| 8401145 | 3/1984 | WIPO | 210/735 |

*Primary Examiner*—Peter A. Hruskoci
*Attorney, Agent, or Firm*—Robert A. Miller; James J. Drake

[57] ABSTRACT

The present invention related to the use of certain cross-linked diallyldimethyl ammonium chloride polymers in water-in-oil emulsion form for use as coagulants in suspensions of inorganic solids. The diallyldimethyl ammonium chloride polymers are preferably polymers of diallyldimethyl ammonium chloride, acrylamide, and triallylamine. The water-in-oil emulsions are formulated to invert after addition to the inorganic solids suspension, as the suspension travels to a mechanical thickening device for further processing. The inorganic solids from refuse or concentrate mineral processing applications may be coal, copper ore, sand, gravel, taconite, beryllium, trona, kaolin or precious metals.

12 Claims, No Drawings

5,653,886

COAGULANT FOR MINERAL REFUSE SLURRIES

This application is a continuation-in-part of U.S. patent application Ser. No. 08/178,169 entitled "Coagulant for Mineral Refuse Slurries" filed on Jan. 6, 1994 now abandoned.

INTRODUCTION

The present invention related to the use of certain cross-linked diallyldimethyl ammonium chloride polymers in water-in-oil emulsion form for use as coagulants in suspensions of inorganic solids. The diallyldimethyl ammonium chloride polymers are preferably polymers of diallyldimethyl ammonium chloride, acrylamide, and triallylamine. The water-in-oil emulsions are formulated to invert after addition to the inorganic solids suspension, as the suspension travels to a mechanical thickening device for further processing. The inorganic solids from refuse or concentrate mineral processing applications may be coal, copper ore, sand, gravel, taconite, beryllium, trona, kaolin or precious metals.

BACKGROUND OF THE INVENTION

Coal is the most abundant natural energy source in the world. A significant portion of the United States domestic energy requirements are met by burning coal as a fossil fuel. There are various types of coal found within the United States., i.e., anthracite, semi-anthracite, low-volatile bituminous coal, medium and high volatile bituminous coal, sub-bituminous coal, and lignite. Coals such as anthracite and semi-anthracite typically have high ash and sulfur contents and therefore require beneficiation prior to use.

The primary purpose of coal beneficiation is to reduce the incombustible ash content, thus enhancing the heat content. Reduction in the ash content results in savings in transportation and ash disposal costs. Sulfur, mainly in the form of purite, is also reduced.

Another important economic factor to be considered in coal processing is the recovery and reuse of process water. Water is typically very expensive and there are often limits on total usage. Also, strict environmental controls prohibit or severely limit discharge of process water. Thus, it is imperative that solids be efficiently removed from the process water and thereafter that the water is recycled to the process stream.

Beneficiation of coal is effected using two primary properties of coal, i.e., (1) differences in specific gravity between coal and its impurities, and (2) differences in surface characteristics between coal and its impurities. Since the higher ash content fractions are usually found in the finer coal sizes, some plants only screen out these sizes to beneficiate the coal. However, since the quantity of such fine coal is on the rise, even this is treated.

A coal beneficiation plant may be broadly categorized into specific gravity separation and fine coal treatment. In gravity separation, cleaning units make use of the differences in specific gravity between coal and its impurities to effect separation. Normally, the specific gravity of the clean coal is less than its impurities. Some commonly used equipment for gravity separation are: jigs, heavy medium baths and cyclones, washing tables, water only cyclones and spirals.

Fine coal treatment incorporates a flotation cell(s), clean coal filter and thickener. In the flotation cell, a collector and frother are added to the flotation feed. The collector (e.g., diesel oil #2) selectively imparts hydrophobicity to the coal particles. This increased hydrophobicity makes the air bubbles more likely to attach to the coal particles. The frother (e.g., an alcohol based product) reduces the surface tension of the air/water interface, thus making a stable froth.

The concentrate (i.e., clean coal) from the flotation cells goes to the clean coal filter and is dewatered. The tailings from the flotation cell go to the thickener where they are thickened and discharged. After being treated in the thickener, the concentrated solids may be further treated or dewatered to produce a material suitable for disposal by landfill or other means.

In the thickener, the inorganic solids are typically treated with coagulants and flocculants to enhance settling. Typically, the coagulants and flocculants are added at several points along the feed line to the thickener and in different sequences. Coagulation is the destabilization by surface charge neutralization of stable negatively charged particles that are in suspension (i.e., settleable or dispersed) through the utilization of inorganic salts or cationic polyelectrolytes. Flocculation is the aggregation of finely divided particles which are suspended in a liquid through the utilization of an entrapping agent (i.e., an inorganic flocculant) or a bonding agent (i.e., an organic flocculant) that brings the particles together.

Although some inorganics, principally alum and iron salts, are still used as coagulants, water soluble organic polymers are more commonly used. These water-soluble polymers can be either naturally occurring or synthetic polymers. The principal natural polymers are starch and guar, both of which are high-molecular weight polymers of simple sugars (i.e., polysaccharides). Specifically, starch is a polymer of glucose consisting of a mixture of linear (amylose) and branched (amylopectin) segments.

An advantage of synthetic polymers is that they can be tailored to a specific application. Therefore, a wide range of commercially available coagulants and flocculants of varying charges, compositions and molecular weights have been developed. The most widely used synthetic coagulants are polydiallyldimethyl ammonium chloride as described in U.S. Pat. No. 2,926,161 and condensation polymers of dimethyl amine and epichlorohydrin such as those described in U.S. Reissue Pat. Nos. 28,807 and 28,808. These polymers vary greatly in molecular weight, typically ranging from several thousand to as high as 500,000. Condensation polymers are made in solution form, and are available commercially as aqueous solutions containing a relatively low weight percent polymer. Polydiallyldimethyl ammonium chloride is a vinyl addition polymer, which (at the molecular weights used for coagulation) has also been made in solution form. Typical commercially available polydiallyldimethyl ammonium chloride is available in aqueous solutions containing 1–20% by weight polymer. Copolymers of diallyldimethylammonium chloride and acrylamide having utility for the dewatering of mineral slurries have been described in U.S. Pat. No. 4,673,511.

Dry water soluble polymers such as dry polydiallyldimethyl ammonium chloride have also been used to dewater coal refuse slurries. These polymers have met with some success, dissolving in the refuse thickener over a period of 45 to 60 seconds. Such time is long enough to provide continuous feed of fresh polymer into the coal/clay slurry. Disadvantages of dry polymer however are that it produces dust; if not carefully fed, may produce gelled agglomerates which can foul feeding equipment; and is difficult to handle because the material is packaged in bags which must be moved into proximity of the thickener, thereby preventing feeding from a remote point more convenient to chemical delivery and handling. The polymers of the present invention overcome these deficiencies by providing dissolution of the polymer over a time period which insures a continuous supply of fresh coagulant to the thickener.

Polymeric materials similar to those of the instant invention have been disclosed in several patents. U.S. Pat. No. 4,950,725 issued to Flesher et at. describes a water-soluble polymeric material with a triallylamine quaternary ammonium salt cross-linker. U.S. Pat. No. 5,210,298 issued to Shimomura et at. describes an acrylate-containing polymer with a triallylamine cross-linker, and U.S. Pat. No. RE 32,649 issued to Brandt et at. describes a hydrogel forming, water-insoluble polymer slightly cross-linked with triallylamine. EP 161–763A describes a water-soluble and swellable co-polymer formed of a diallyl ammonium salt, monofunctional vinyl compound and polyfunctional vinyl compound. However, the inventors have discovered that the unique properties of this polymer make it ideal for use as a controlled-release coagulant for concentrating aqueous suspensions of inorganic solids.

The present invention is directed to the use of water-in-oil emulsions of certain medium molecular weight polydiallyldimethyl ammonium chloride polymers which may be used as coagulants in the thickening process during coal beneficiation. These water-in-oil emulsions of diallyldimethyl ammonium chloride polymers exhibit improved performance or activity in coal tailings thickening over solution polymers or conventional water-in-oil emulsions of diallyldimethyl ammonium chloride polymers. In addition, due to the slow inversion rate of the water-in-oil emulsion of the diallyldimethyl ammonium chloride polymer prior to addition to the thickener feed, the performance of the polymer is improved. As such, the polymer coagulants of this invention exhibit higher performance than lower molecular weight polymers of diallyldimethyl ammonium chloride, either in solution or water-in-oil emulsion form. In addition, the polymers of the subject invention eliminate the handling difficulties associated with dry coagulants.

The present invention also provides many additional advantages which shall become apparent as described below.

SUMMARY OF THE INVENTION

The present invention related to the use of certain cross-linked diallyldimethyl ammonium chloride polymers in water-in-oil emulsion form for use as coagulants in suspensions of inorganic solids. The diallyldimethyl ammonium chloride polymers are preferably polymers of diallyldimethyl ammonium chloride, acrylamide, and triallylamine. The water-in-oil emulsions are formulated to invert after addition to the inorganic solids suspension, as the suspension travels to a mechanical thickening device for further processing.

The inorganic solids from refuse or concentrate mineral processing applications may be coal, copper ore, sand, gravel, taconite, beryllium, trona, kaolin or precious metals.

The diallyldimethyl ammonium chloride polymers of this invention may be homo or copolymers of diallyldimethyl ammonium chloride. While polydiallyldimethyl ammonium chloride is a useful polymer for practicing the subject of this invention, preferred diallyldimethyl ammonium chloride polymers are terpolymers of diallyldimethyl ammonium chloride, acrylamide, and triallyl amine. The diallyldimethyl ammonium chloride polymers are preferably added to the coal refuse slurry in the form of a water-in-oil emulsion. This emulsion inverts over a controlled period of time in the coal refuse slurry, releasing the polymer contained therein over a period of time sufficient to allow contact of the particles in the slurry with the polymer.

Other objects, advantages and features of the present invention will be understood by reference to the following specification.

THE INVENTION

The invention is a process for concentrating an aqueous suspension of inorganic solids comprising the steps of:

A. adding to an aqueous suspension of inorganic solids upstream of a mechanical thickening device, an effective, coagulating amount of a water-in-oil emulsion of a finely divided diallyldimethyl ammonium chloride-containing polymer, said emulsion consisting essentially of water, a hydrocarbon oil, a low HLB surfactant and said polymer; said polymer having an intrinsic viscosity in 1M NaNO$_3$ of from 0.8 to 4.2 dl/gm;

B. transporting the aqueous suspension containing the diallyldimethyl ammonium chloride-containing polymer under turbulent flow conditions to a mechanical thickening device;

C. adding the transported aqueous suspension to the mechanical thickening device;

D. separating the inorganic solids from the inorganic solids suspension in said mechanical thickening device, thereby producing an inorganic solids layer and a clarified liquid;

E. withdrawing the clarified liquid having a reduced level of suspended inorganic solids from the mechanical thickening device; and F. discharging the concentrated inorganic solids from the mechanical thickening device.

The inorganic solids from refuse and concentrate mineral processing applications are selected from the group consisting of coal, copper ore, sand, gravel, taconite, beryllium, trona, kakolin and precious metals. Coal encompasses both coal refuse and clean coal.

The coagulant is cross-linked with from 0.001 to 0.9 mole percent of a cross-linking agent selected from the group consisting of triallylamine, methylene bisacrylamide, tetraallyl ethylene diamine and tetraallyl ammonium bromide and combinations thereof.

Preferably, the diallyldimethylammonium chloride containing polymer has an intrinsic viscosity in 1M NaNO$_3$ of from 1–3 dl/gm, and most preferably from 1.2–2.4 dl/gm..

The water-in-oil emulsion of the finely divided diallyldimethyl ammonium chloride-containing polymer inverts in from one second to five minutes after addition to the aqueous suspension and wherein said water-in-oil emulsion is at least partially inverted prior to addition of said aqueous suspension to the mechanical thickening device. The diallyldimethyl ammonium chloride-containing polymer is a terpolymer of diallyldimethyl ammonium chloride, acrylamide, and triallylamine in a mole ratio range of:

| diallyldimethyl ammonium chloride | 70–99.9 |
|---|---|
| acrylamide | .1–30 |
| triallyamine | .001–0.9 |

Preferably, the diallyldimethyl ammonium chloride-containing polymer is a terpolymer of diallyldimethyl ammonium chloride, acrylamide, and triallylamine in a mole ratio range of:

| diallyldimethyl ammonium chloride | 80–99.9 |
|---|---|
| acrylamide | 0.5–20 |
| triallylamine | .001–0.7. |

Most preferably, the diallyldimethyl ammonium chloride-polymer is a terpolymer of diallyldimethyl ammonium chloride, acrylamide, and triallylamine in a mole ratio range of:

| diallyldimethyl ammonium chloride | 90–99.9 |
|---|---|
| acrylamide | 1.0–10 |
| triallyamine | .001–0.5. |

The process may further comprise the addition of a flocculant to said aqueous suspension of inorganic solids, just prior to the mechanical thickening device.

This invention is directed to the coagulation of coal refuse slurries utilizing as the coagulant a diallyldimethyl ammonium chloride polymer contained in a water-in-oil emulsion form. The water-in-oil emulsions of diallyldimethyl ammonium chloride polymers described herein release the polymer over a predetermined period, allowing for the fresh supply of coagulant during the thickening operation, providing for a superior result.

The water-in oil emulsions of the diallyldimethyl ammonium chloride polymers of this invention contain four basic components. These components and their weight percentages in the emulsions are listed below:

A. Water-soluble diallyldimethyl ammonium chloride polymer:
  1. Generally from 5–60%;
  2. Preferably from 20–50%; and
  3. Most preferably from 25–40%;
B. Water:
  1. Generally from 20–90%;
  2. Preferably from 20–70%; and
  3. Most preferably from 30–55%;
C. Hydrophobic liquid:
  1. Generally from 20–90%;
  2. Preferably from 20–70%
  3. Most preferably from 25–40%; and,
D. Water-in-oil emulsifying agent:
  1. Generally from 0.1–21%;
  2. Preferably from 1–15%;
  3. Most preferably from 1.2–10%.

It is also possible to further characterize the water-in-oil emulsions of water-soluble diallyldimethyl ammonium chloride polymers with respect to the aqueous phase of the emulsion. This aqueous phase is generally defined as the sum of the polymer or copolymer present in the emulsion plus the amount of water present in the emulsion. This terminology may be utilized in describing the water-in-oil emulsions which are useful in this invention. Utilizing this terminology, the aqueous phase of the water-in-oil emulsions of this invention generally comprise 25–95% by weight of the emulsion. Preferably, the aqueous phase is between 60–90% by weight of the emulsion, and, most preferably, from 60–85% by weight of the emulsion.

The emulsion also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water/oil ratio will range from 0.5–14, and most preferably, from 1.0–2.75.

In certain instances it is possible to remove substantial quantities of water from the above emulsions while still maintaining the physical and chemical characteristics of the emulsions. Such concentrated, substantially, water-free emulsions, e.g. less than 3% by weight water, are contemplated as being capable of use in the practice of this invention.

A simple method for removing water from emulsions of this type consists of heating said emulsions in the presence of an azeotropic agent for water such as toluene with the temperature being sufficient to form an azeotrope which thereby allows water removal to be achieved. This also allows the emulsion to remain in the form of a water-in-oil emulsion even though it contains very little water.

THE DIALLYLDIMETHYL AMMONIUM CHLORIDE POLYMERS

The polymers contained in the water-in-oil emulsions of this invention may be homo or copolymers of diallyldimethyl ammonium chloride. In making these polymers, diallyldimethyl ammonium chloride may be polymerized by itself in water-in-oil emulsion form, or may be copolymerized with non-ionic monomers such as acrylamide or methacrylamide, or with other cationically charged vinyl addition monomers. In the practice of this invention we have found it particularly useful if the diallyldimethyl ammonium chloride is polymerized with a small amount of a difunctional crosslinking agent. Among the crosslinking agents which may be used include triallylamine, methylenebisacrylamide, tetrallyl ammonium chloride, and methyltriallylammonium chloride, divinyl benzene, diallyl phthalate, polyallyl ethers of polyhydroxyl compounds, e.g., polyallyl sucrose, diallyl sorbitol, and other polyolefinic unsaturated compounds known to those skilled in the art of radical polymerization that normally, in systems other than inverse emulsion, lead to the formation of three dimensional networks when used in high proportions. A preferred crosslinking agent is triallylamine. Other crosslinking agents which will be readily apparent to those skilled in the art of vinyl polymerization chemistry not mentioned above may also be used providing that the resultant polymer is only lightly crosslinked and remains water soluble.

The polymers of this invention generally contain from 70 to 99.9 mole percent diallyldimethyl ammonium chloride, from 0.1 to 30 mole percent acrylamide or methacrylamide and from 0.001 to 0.9 mole of a vinyl crosslinking agent. Preferably, the polymers of this invention contain from 80 to 99.9 mole percent diallyldimethyl ammonium chloride, from 0.5–20 mole percent acrylamide or methacrylamide and from 0.001 to 0.7 mole percent of vinyl crosslinking agent, preferably triallyl amine. Most preferably, the polymers of this invention contain from 90 to 99.9 mole percent diallyldimethyl ammonium chloride, from 1.0–10 mole percent acrylamide and from 0.001–0.5 mole percent triallyl amine. The preferred polymer for use in this invention contains 95.0 mole percent diallyldimethyl ammonium chloride, 4.95 mole percent acrylamide, and 0.05 mole percent triallylamine.

The diallyldimethyl ammonium chloride polymers of this invention have intrinsic viscosities in 1M $NaNO_2$ of from 0.8 to 4.2 dl/gm, and preferably from 1.2 to 2.4 dl/gm. This corresponds to molecular weights of from 100,000 to 500,000 amu.

The molecular weight of the diallyldimethyl ammonium chloride polymers which are the subject of this invention is generally considerably higher than the water soluble polydiallydimethyl ammonium chloride materials which are now available commercially as solution polymers and which have heretofore been employed as coagulants in the treatment of coal slurry refuse streams.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these type of materials include a branch-chain isoparaffinic solvent sold by Exxon Chemicals under the tradename "Escaid 110". Typical specifications of this material are set forth below in Table 1.

TABLE 1

| Specific Gravity 15.56/15.56° C. | 0.780–0.800 |
| Color, Saybolt | +30 min. |
| Appearance Visual | Clear, Water White |
| Aniline Point, °F., ASTM D-11 | 150° F.–176° F. |
| Distillation, °F., ASTM D-86 IBP | 379 min. |
| Flash Point, PMCC | 76.7° C. Min. |

While paraffinic oils are the preferred materials for use in preparing the water-in-oil emulsions of this invention, other organic liquids can be utilized. Thus, mineral oils, kerosene, naphthas, and in certain instances, petroleum may be used. While useful in this invention, solvents such as benzene, xylene, toluene and other water immiscible hydrocarbons having low flash points or toxic properties are generally avoided due to problems associated with their handling or use.

As stated earlier, the polymers of this invention are in the form of water-in-oil emulsions. Water-in-oil emulsions of water soluble vinyl addition polymers are more fully described in U.S. Pat. No. 3,284,393 to Vanderhoff and in U.S. Pat. No. 3,624,019 to Anderson et al., both of which are hereinafter incorporated by reference. The diallyldimethyl ammonium chloride polymers of the present invention are preferably prepared by mixing the oil-phase and water phase in the presence of a water-in-oil emulsifying agent, and subjecting the resultant emulsion to free radical polymerization conditions.

Any conventional water-in-oil emulsifying agent can be used such as sorbitan monostearate, sorbitan monooleate, and the so called low HLB materials which are all documented in the literature and are summarized in the Atlas HLB Surfactant selector. Although the mentioned emulsifiers are used in producing good water-in-oil emulsions, other surfactants may be used so long as they are capable of producing these emulsions. The water-in-oil emulsifying agents are present in the emulsion in amounts ranging from between 0.1 and 21 percent by weight of the emulsion. The preferred range is between 1.0 and 15.0% of the emulsion. The most preferred range is between 1.2 and 10% by weight of the emulsion.

The polymers contemplated for use in this invention may be synthesized in emulsion form as described in Vanderhoff et al., U.S. Pat. No. 3,284,393 which is hereby incorporated by reference. The free radical inverse emulsion polymerization technique set forth in Vanderhoff is generally followed in preparing polymeric latexes used in this invention. The water-in-oil emulsions used in the practice of this invention exhibit the unique ability of allowing the water soluble polymer contained therein to rapidly dissolve into aqueous solution. The polymer-containing emulsion releases the polymer in water in the presence of a surfactant in a very short period of time. This technique is described in Anderson et al., U.S. Pat. No. 3,624,019 and U.S. Pat. No. 3,734,873. Alternatively, the polymers may be precipitated from the emulsions using a polar organic liquid such as acetone.

When a surfactant is used to invert the emulsion, it may be added to the emulsion itself, or may be added to the aqueous system into which the emulsion is to be added. Surfactants used to invert the emulsions are generally water-soluble, high-HLB value surfactants such as ethoxylated nonyl phenols, ethoxylated primary alcohols, and ethoxylated secondary alcohols.

In a preferred embodiment of this invention, no surfactant is used to invert the emulsion and emulsion inversion is caused by shear in the system. In mining applications, the polymer of the instant invention is generally added after the cyclone discharged. The aqueous suspension of inorganic solids and polymer then travels approximately 100 to 200 yards before reaching the centerwell of the mechanical thickening device, which is typically a thickener. As the polymer travels from the cyclone discharge to the thickener in the suspension of inorganic solids, the inversion process takes place.

As discussed above, one of the points which differentiates this invention from that of the prior art is the controlled dissolution of the diallyldimethyl ammonium chloride polymers in the coal refuse slurry. While it is known to regulate the rate of inversion of water-in-oil emulsions as disclosed in U.S. Pat. No. 4,252,706 which is hereinafter incorporated by reference into this specification, this technique had not been known in relation to the inversion of water-in-oil emulsions of medium molecular weight diallyldimethyl ammonium chloride polymers.

In a preferred embodiment of this invention, the hydrophilic/lipophilic balance (HLB) of the surfactants used to prepare the water-in-oil emulsion of the diallyldimethyl ammonium chloride polymer is adjusted so as to allow the polymer contained therein to slowly dissolve upon contact with the coal refuse slurry.

Whereas most water-in-oil emulsions of water soluble vinyl addition polymers are made to invert as quickly as possible, the polymers of the subject invention are designed to invert over a period of time after they have been added to the coal refuse slurry so that a fresh supply of polymer is continually made available during the time period that the coal refuse slurry is present in the clarifier or thickener, i.e., generally from 10 seconds to five minutes depending upon the particular mechanical clarifier and system being treated. Preferably, and depending upon the mechanical characteristics of the system, the water-in-oil emulsion of the diallyldimethyl ammonium chloride polymer will invert over a period of from 15 seconds to two and one-half minutes (150 seconds), and most preferably, from 20 seconds to one minute (60 seconds).

Generally, the water-in-oil emulsions of the diallyldimethyl ammonium chloride polymers of this invention are added to the system without the addition of any so called high HLB surfactant, and the emulsions are allowed to invert into the system based on turbulent flow. Because inversion to an off-in-water emulsion is slow, the corresponding solubilization of the water soluble diallyldimethyl ammonium chloride polymer in the aqueous system is also slow, allowing fresh polymer to be continuously available during the process.

The polymers of the instant invention are prepared by mixing together the contents of the aqueous phase and oil phase, purging the system of oxygen with a inert gas, and initiating the polymerization with a free radical catalyst. Those familiar with the art of vinyl polymerization will readily appreciate the method of forming the polymers of the instant invention. Suitable examples of free radical polymerization of water soluble monomers in water-in-oil emulsion form are found in many issued patents. Generally, during the polymerization procedure usually followed in the course of this invention, the reaction temperature of the diallyldimethyl ammonium chloride polymer is controlled at 30° C. to 70° C. for a period of time sufficient to allow the polymerization to take place. After the exothermic portion of the polymerization, the reaction is heated to 30°–90° C. for a period of time to remove residual monomers, and to make sure that the vinyl monomers have polymerized. The water-in-oil emulsion is then recovered. If desired, oil-in-water surfactant useful to invert the emulsion may be added, or, the oil-in-water surfactant may be added to the coal refuse slurry prior to the addition of the water-in-oil emulsion so as to cause the inversion of the water-in-oil emulsion to an oil-in-water emulsion to take place in the coal refuse slurry.

In order to evaluate the process of this invention, a diallyldimethyl ammonium chloride polymer was prepared. The polymerization was carried out in a three liter resin flask equipped with nitrogen sparge tube, thermocouple well, condenser, monomer addition funnel, and stirrer capable of regulation at 1000 r.p.m. Temperature was controlled by using heating tape and an external water sparge. The emulsion was prehomogenized using a commercially available homogenizer for two minutes at high speed. Addition of water soluble initiator to the emulsion was made with a syringe pump. The pH of the monomer solution was adjusted to 3.5 prior to polymerization.

| | |
|---|---|
| Oil Phase: (in percentages by weight of total latex) | 30.5% |
| Escaid 110 | 27 |
| Span 80 (Sorbitan monoleate available from ICI Americas) | 1 |
| Alkaterge T (a 4.0 HLB tall oiloxazoline derivative available from Alkaril, Inc.) | 1 |
| Lonzest STS20 (a POE-20 sorbitan tristearate available from Lonza, Inc.) | 0.5 |
| Hypermer IL2296, a proprietary surfactant (available from ICI Americas, Inc.) | 1 |
| Water Phase: | |
| Diallyldimethyl ammonium chloride (95 mole %) Acrylamide (4.95 mole %) triallyl amine (0.05 mole %) | |
| TOTAL MONOMER PERCENT | 40 |
| Water | 29.4 |
| Catalyst- Vazo 200 64 Vazo ® 52 initiator | 0.05/0.05 |
| Post treatment- ammonium persulfate | 0.3 weight percent |

The resultant water-in-oil emulsion of diallyldimethyl ammonium chloride polymer was determined to have a reduced specific viscosity of 3.23 dl/g and an intrinsic viscosity of 3.02 dl/g. The polymer was found to be 94.94% converted by liquid chromatography, and the water-in-oil emulsion was found to contain 37.98% by weight polymer. This material is hereinafter described as Sample F. Additional materials were prepared having different monomer ratios using the above described procedure. These materials along with Sample F are detailed in Table 2.

TABLE 2

| Example | mole % DADMAC | mole % AcAm | mole % TAA | Comments |
|---|---|---|---|---|
| A | 80 | 19.9 | 0.1 | |
| B | 85 | 14.9 | 0.1 | |
| C | 75 | 24.95 | 0.05 | |
| D | 90 | 9.9 | 0.1 | |
| E | 95 | 4.85 | 0.15 | (1) |
| F | 95 | 4.95 | 0.05 | |
| G | 95 | 4.95 | 0.05 | 1% ACTIVATOR(2) |
| H | 95 | 4.95 | 0.05 | 2% ACTIVATOR(2) |
| I | 95 | 4.95 | 0.05 | 4% ACTIVATOR(2) |
| J | 95 | 4.95 | 0.05 | |
| K | 95 | 4.85 | 0.15 | (1) |
| L | 80 | 19.85 | 0.15 | |
| M | 95 | 4.85 | 0.15 | |

(1)Made using less Lorizest surfactant. Activator was a 12 mole ethoxylated secondary alcohol surfactant.
(2)Percentage by weight of the emulsion.
DADMAC = diallyldimethyl ammonium chloride; AcAm = acrylamide; TAA = triallylamine.

Samples of Polymers A–M and certain commercially available dry polymers were evaluated in a test designed to simulate coal refuse clarification. The apparatus employed consisted of a 5 gallon bucket having three plastic baffles added to its inside wall at 120° intervals. These baffles were the height of the lowest outside rim and were extended approximately three inches into the center of the bucket. The baffles were made of ¼ inch thick plastic stock, and they were attached to the bucket using silicone glue and screws. Different agitation rates were obtained by using a Lightning Mixer controlled with a rheostat. The impeller used was a square, flat, three-bladed stainless steel type with the blades being one inch wide and 3 inches long at 120° angles from each other. The test methodology is described in steps a–g below.

a. Four and one/half gallons of fresh thickener feed slurry were agitated in the baffled buckets;

b. 0.1 ml of the latex polymer was injected into the agitated slurry;

c. 500 ml samples were taken at 20, 40, and 60 second time intervals in 500 ml graduated cylinders;

d. When samples were taken, 6 ml of a 0.05% aqueous solution of a high molecular weight anionic flocculant (Nalco®9810, a commercially available 40% actives water-in-oil emulsion of a sodium acrylate-acrylamide copolymer) were added to the cylinder;

e. The cylinder was inverted six times;

f. The settling rate vs. time was measured on the cylinder;

g. The NTU turbidity was measured on each sample after three minutes of settling time.

Samples A–M above were evaluated using fresh thickener feed from a commercial coal preparation treatment plant. The rheostat setting was 68%. The materials were evaluated against a commercially available dry cationic polydiallyldimethyl ammonium chloride polymer which was used at a 0.10 gram size sample. Results are shown in Table 3.

TABLE 3

| EXAMPLE | SAMPLE TIME (Seconds) | TURBIDITY (NTU) |
|---|---|---|
| A | 20 | 46 |
| | 40 | 41 |
| | 60 | 41 |
| B | 20 | 35 |

TABLE 3-continued

| EXAMPLE | SAMPLE TIME (Seconds) | TURBIDITY (NTU) |
|---|---|---|
|  | 40 | 28 |
|  | 60 | 33 |
| C | 20 | 44 |
|  | 40 | 31 |
|  | 60 | 39 |
| D | 20 | 33 |
|  | 40 | 35 |
|  | 60 | 36 |
| M | 20 | 39 |
|  | 40 | 35 |
|  | 60 | 27 |
| E | 20 | 78 |
|  | 40 | 67 |
|  | 60 | 69 |
| F | 20 | 32 |
|  | 40 | 32 |
|  | 60 | 30 |
| K | 20 | 60 |
|  | 40 | 50 |
|  | 60 | 50 |
| J | 20 | 36 |
|  | 40 | 36 |
|  | 60 | 28 |
| L | 20 | 48 |
|  | 40 | 46 |
|  | 60 | 46 |
| G | 32 | 32 |
|  | 41 | 41 |
|  | 34 | 34 |
| H | 20 | 54 |
|  | 40 | 42 |
|  | 60 | 38 |
| I | 20 | 53 |
|  | 40 | 30 |
|  | 60 | 36 |
| Blank (no cationic) | 20 | 160 |
| DRY[3] | 20 | 28 |
|  | 40 | 23 |
|  | 60 | 26 |
| DRY[3] | 15 | 42 |
|  | 40 | 50 |
|  | 60 | 46 |
| DRY - Fine[1] (3,4) | 15 | 42 |
|  | 40 | 51 |
|  | 60 | 51 |
| B | 15 | 44 |
|  | 40 | 40 |
|  | 60 | 40 |
| D | 15 | 54 |
|  | 40 | 38 |
|  | 60 | 37 |
| F | 15 | 50 |
|  | 40 | 37 |
|  | 60 | 27 |
| M | 15 | 55 |
|  | 40 | 44 |
|  | 60 | 38 |
| I | 15 | 50 |
|  | 40 | 60 |
|  | 60 | 65 |

[3]Dry polydiallyldimethyl ammonium chloride polymer having an intrinsic viscosity of approximately .75.
[4]material ground in mortar and pestle.

The coagulant polymer of the instant invention is generally added to the coal refuse slurry at a point in the process where there is significant turbulence. This turbulence, as stated above helps the water-in-oil emulsion invert, slowly releasing the polymer into the aqueous system. In the preferred practice of this invention, the polymer is added directly after the hydrocyclones, where often the flow must travel 50–250 feet to reach the clarifier. Because of the rate of flow, the polymer is intimately admixed with the coal refuse slurry prior to reaching the clarifier. In the event that inversion of the polymer is too slow, and as a result, not enough polymer is released into the aqueous system, mixing devices such as static mixers and or a pump may be added to the system to provide shear for inverting the water-in-oil emulsion.

The cationic polymer of the instant invention is generally added to the coal refuse slurry at a rate of 0.05–0.75 pounds of polymer (as polymer actives) per ton of coal refuse solids. Generally, we prefer to add 0.075–0.55 pounds of polymer per ton of coal refuse, and, most preferably, from 0.1–0.4 pounds of polymer per ton of solids. Generally this will translate to a level of from 20–500 ppm of polymer in the coal refuse slurry, and preferably, from 50–250 ppm of polymer. Most preferably, from 75–150 ppm of polymer is added to the coal refuse slurry.

The anionic flocculant polymer which is added after the cationic polymer of this invention is generally added at a point at or near the clarifier, and after the cationic polymer has had a chance to mix with the coal refuse slurry. Preferably, the anionic polymer is added at a point at or near the center well of the clarifier where the mixture of coal refuse slurry and cationic polymer admixture enters the clarifier. The anionic polymer in contrast to the cationic polymer of the invention should be readily soluble and available to the coal refuse slurry. We have found that it is not generally advantageous to provide an anionic flocculant in water-in-oil emulsion form which is slow to invert, and accordingly, water-in-oil emulsions of anionic flocculant polymers should be used that readily invert, releasing the polymer contained in those emulsions. Those skilled in the art will readily understand how to prepare and use a readily invertible water-in-oil emulsion of a water soluble anionic vinyl addition polymer flocculant.

The amount of anionic polymer that is added will approximate the amount of cationic polymer added, and the dosage rates listed above for the cationic polymer are also accordingly applicable to the addition of the high molecular weight anionic polymer to the coal refuse slurry at or near the center well of the clarifier.

Gravity Dewatering Test Procedure

The gravity dewatering test is a tool for reliably screening products and evaluating application variables for dewatering. Results obtained in testing can generally be directly translated to the plant process. The following procedure outlines suggested steps in performing a thorough test program.

1. An apparatus consisting of a 500 ml graduated cylinder, powder funnel, and plastic collar which retains a filter cloth on the top of the powder funnel, all supported by a ring stand and appropriate clamps was constructed. The filter cloth used was a nylon Filterlink® 400 mesh round orifice cloth of a type similar to that used in commercial practice.
2. Obtain 5–10 gallons of untreated dewatering feed (clarifier underflow) and set up the test apparatus.
3. Using a spatula, hand mix the slurry to uniformly disperse any coarse solids present. Immediately sample and transfer 200 ml of undertow slurry into a 500 ml graduated cylinder. Re-mix the underflow slurry prior to filling each new cylinder.
4. Measure in a syringe and set aside the desired amount of coagulant as 1% solution. Measure and add the desired amount of anionic polymer flocculant stock solution to a 50 or 100 ml graduated cylinder, dilute to a total of 20 ml (or 10% of the underflow slurry volume) with process water, mix thoroughly, and set aside.

5. Invert the 500 ml graduate cylinder containing the 200 ml of underflow slurry 3–4 times to thoroughly disperse the solids, then immediately add the pre-measured flocculant solution from step 3, re-stopper the cylinder and invert 4 times. Duplicate the mixing motion as closely as possible in each test.

6. Immediately add the pre-measured coagulant solution, re-stopper and invert 2 additional times.

7. Pour the conditioned slurry into the plastic collar section of the test apparatus and immediately start a stopwatch. Record the drainage volumes collected every 10 seconds for a time period greater than actual commercial plant process time for gravity drainage. After removing the plastic collar, note the dewatered cake stability and thickness. If the thickness is significantly different from plant conditions, adjust the initial test slurry volume in step 2 accordingly.

8. Repeat testing, adjusting products and dosages to obtain maximum free drainage volumes in the process time allowed. Plot out both volume vs. time and the 10 second volume vs. dosage data as testing proceeds to double-check results. Reasonable data should plot along a relatively smooth curve. Scattered data points indicate either errors or possible sample deterioration.

B. transporting the aqueous suspension containing the diallyldimethyl ammonium chloride-containing polymer under turbulent flow conditions to a mechanical thickening device;

C. adding the transported aqueous suspension to the mechanical thickening device;

D. allowing said water-in-oil emulsion to slowly invert as the suspension travels to the mechanical thickening device to an oil-in-water emulsion under said turbulent flow conditions in the presence of said surfactant, thereby slowly releasing continuously said polymer in said aqueous suspension to contact said inorganic solids, wherein the water-in-oil emulsion inverts in from 10 seconds to five minutes after addition to the aqueous suspension, and wherein said water-in-oil emulsion is at least partially inverted prior to addition of said aqueous suspension to the mechanical thickening device;

E. separating the inorganic solids from the inorganic solids suspension in said mechanical thickening device, thereby producing an inorganic solids layer and a clarified liquid;

F. withdrawing the clarified liquid having a reduced level of suspended inorganic solids from the mechanical thickening device; and

TABLE 4

| DADMAC MOLE % | ACAM MOLE % | CROSS-LINKER MOLE % | TYPE CATIONIC POLYMER | CROSS-LINKER | FREE DRAINAGE (mls)[1] | | |
|---|---|---|---|---|---|---|---|
| | | | | | 0.25 | 0.50 | 0.75 |
| 95 | 4.999 | 0.001 | LATEX | METHYLENE BISACRYLAMIDE | 50 | 49 | 55 |
| 95 | 4.99 | 0.01 | LATEX | METHYLENE BISACRYLAMIDE | 48 | 56 | 64 |
| 95 | 4.95 | 0.05 | LATEX | TRIALLYLAMINE | 54 | 58 | 62 |
| 95 | 4.9855 | 0.0145 | LATEX | TETRA ALLYL ETHYLENEDIAMINE | 52 | 60 | 58 |
| 95 | 4.9882 | 0.0118 | LATEX | TETRA ALLYL AMMONIUM BROMIDE | 40 | 50 | 58 |
| 95 | 4.9 | 0.1 | LATEX | TRIALLYLAMINE | 36 | 56 | 60 |
| 100 | — | 0 | SOLUTION | NONE | 48 | 52 | 55 |
| — | — | 0 | NONE | NONE | 28 | 40 | 54 |

1 = The Free Drainage reported above is mls at 15 seconds for 0.25, 0.50 and 0.75 mls of cationic polymer added. Each sample was also treated with 2 mls of 1% anionic flocculant.

Polymers of the invention were tested according to the gravity dewatering test procedure described above.

The results in Table 4 demonstrate that the cross-linked polymers of the invention hasten drainage to a greater extent than conventional poly(DADMAC) treatments. For comparison purposes, free drainage results in the absence of cationic polymer are also provided.

Having thus described our invention, we claim:

1. A process for concentrating an aqueous suspension of inorganic solids comprising the steps of:

A. adding to an aqueous suspension of inorganic solids upstream of a mechanical thickening device, an effective, coagulating amount of a water-in-oil emulsion of a finely divided diallyldimethyl ammonium chloride-containing polymer, said emulsion consisting essentially of water, a hydrocarbon oil, a low HLB surfactant and said polymer; said polymer having an intrinsic viscosity in 1M $NaNO_3$ of from 0.8 to 4.2 dl/gm, wherein the polymer is cross-linked with from 0.001 to 0.9 mole percent of a cross-linking agent selected from the group consisting of triallylamine, methylene bisacrylamide, tetraallyl ethylene diamine, and tetraallyl ammonium bromide, and combinations thereof;

G. discharging the concentrated inorganic solids from the mechanical thickening device.

2. The process of claim 1 wherein the inorganic solids from refuse and concentrate applications are selected from the group consisting of coal, copper ore, sand, gravel, taconite, beryllium, trona, kaolin and precious metals.

3. The method of claim 1 wherein the diallyldimethyl ammonium chloride-containing polymer is a terpolymer of diallyldimethyl ammonium chloride, acrylamide, and triallyamine in a mole ratio range of:

| diallyldimethyl ammonium chloride | 70–99.9 |
|---|---|
| acrylamide | .1–30 |
| triallyamine | .001–0.9. |

4. The process of claim 3 further comprising the addition of a flocculant to said aqueous suspension of inorganic solids just prior to the mechanical thickening device.

5. A process for concentrating an aqueous suspension of inorganic solids comprising the steps of:

A. adding to an aqueous suspension of inorganic solids upstream of a mechanical thickening device, an effective, coagulating amount of a water-in-oil emulsion of a finely divided diallyldimethyl ammonium chloride-containing polymer, said emulsion consisting essentially of water, a hydrocarbon oil, a low HLB surfactant and said polymer; said polymer having an intrinsic viscosity in 1M $NaNO_3$ of from 1 to 3 dl/gm, wherein the polymer is cross-linked with from 0.001 to 0.9 mole percent of a cross-linking agent selected from the group consisting of triallylamine, methylene bisacrylamide, tetraallyl ethylene diamine, and tetraallyl ammonium bromide, and combinations thereof;

B. transporting the aqueous suspension containing the diallyldimethyl ammonium chloride-containing polymer under turbulent flow conditions to a mechanical thickening device;

C. adding the transported aqueous suspension to the mechanical thickening device;

D. allowing said water-in-oil emulsion to slowly invert as the suspension travels to the mechanical thickening device to an oil-in-water emulsion under said turbulent flow conditions in the presence of said surfactant, thereby slowly releasing continuously said polymer in said aqueous suspension to contact said inorganic solids, wherein the water-in-oil emulsion inverts in from 10 seconds to five minutes after addition to the aqueous suspension, and wherein said water-in-oil emulsion is at least partially inverted prior to addition of said aqueous suspension to the mechanical thickening device;

E. separating the inorganic solids from the inorganic solids suspension in said mechanical thickening device, thereby producing an inorganic solids layer and a clarified liquid;

F. withdrawing the clarified liquid having a reduced level of suspended inorganic solids from the mechanical thickening device; and G. discharging the concentrated inorganic solids from the mechanical thickening device.

6. The process of claim 5 wherein the inorganic solids from refuse and concentrate applications are selected from the group consisting of coal, copper ore, sand, gravel, taconite, beryllium, trona, kaolin and precious metals.

7. The process of claim 5 wherein the diallyldimethyl ammonium chloride-containing polymer is a terpolymer of diallyldimethyl ammonium chloride, acrylamide, and triallylamine in a mole ratio range of:

| diallyldimethyl ammonium chloride | 80–99.9 |
| acrylamide | 0.5–20 |
| triallylamine | .001–0.7. |

8. The process of claim 7 further comprising the addition of a flocculant to said aqueous suspension of inorganic solids just prior to the mechanical thickening device.

9. A process for concentrating an aqueous suspension of inorganic solids comprising the steps of:

A. adding to an aqueous suspension of inorganic solids upstream of a mechanical thickening device, an effective, coagulating amount of a water-in-oil emulsion of a finely divided diallyldimethyl ammonium chloride-containing polymer, said emulsion consisting essentially of water, a hydrocarbon oil, a low HLB surfactant and said polymer; said polymer having an intrinsic viscosity in 1M $NaNO_3$ of from 1.2 to 2.4 dl/gm, wherein the polymer is cross-linked with from 0.001 to 0.9 mole percent of a cross-linking agent selected from the group consisting of triallylamine, methylene bisacrylamide, tetraallyl ethylene diamine, and tetraallyl ammonium bromide, and combinations thereof;

B. transporting the aqueous suspension containing the diallyldimethyl ammonium chloride-containing polymer under turbulent flow conditions to a mechanical thickening device;

C. adding the transported aqueous suspension to the mechanical thickening device;

D. allowing said water-in-oil emulsion to slowly invert as the suspension travels to the mechanical thickening device to an oil-in-water emulsion under said turbulent flow conditions in the presence of said surfactant, thereby slowly releasing continuously said polymer in said aqueous suspension to contact said inorganic solids, wherein the water-in-oil emulsion inverts in from 10 seconds to five minutes after addition to the aqueous suspension, and wherein said water-in-oil emulsion is at least partially inverted prior to addition of said aqueous suspension to the mechanical thickening device;

E. separating the inorganic solids from the inorganic solids suspension in said mechanical thickening device, thereby producing an inorganic solids layer and a clarified liquid;

F. withdrawing the clarified liquid having a reduced level of suspended inorganic solids from the mechanical thickening device; and G. discharging the concentrated inorganic solids from the mechanical thickening device.

10. The process of claim 9 wherein the inorganic solids from refuse and concentrate applications are selected from the group consisting of coal, copper ore, sand, gravel, taconite, beryllium, trona, kaolin and precious metals.

11. The process of claim 9 wherein the diallyldimethyl ammonium chloride-polymer is a terpolymer of diallyldimethyl ammonium chloride, acrylamide, and triallylamine in a mole ratio range of:

| diallyldimethyl ammonium chloride | 90–99.9 |
| acrylamide | 1.0–10 |
| triallyamine | .001–0.5. |

12. The process of claim 11 further comprising the addition of a flocculant to said aqueous suspension of inorganic solids just prior to the mechanical thickening device.

* * * * *